United States Patent

[11] 3,623,010

[72] Inventor Kenneth E. Burkhalter
Ann Arbor, Mich.
[21] Appl. No. 827,420
[22] Filed May 23, 1969
[45] Patented Nov. 23, 1971
[73] Assignee Information Control Systems, Inc.
Ann Arbor, Mich.

[54] INPUT-OUTPUT MULTIPLEXER FOR GENERAL PURPOSE COMPUTER
8 Claims, 6 Drawing Figs.

[52] U.S. Cl. .......... 340/172.5
[51] Int. Cl. .......... G06f 9/18
[50] Field of Search .......... 340/172.5; 235/157

[56] References Cited
UNITED STATES PATENTS
3,303,476 2/1967 Moyer et al. .......... 340/172.5
3,336,582 8/1967 Beausoleil et al. .......... 340/172.5

*Primary Examiner*—Raolfe B. Zache
*Attorney*—Hauke, Krass, Gifford and Patalidis

ABSTRACT: A plurality of input-output devices are serviced by a single general purpose computer on a time-shared basis through a multiplexer which transfers data between the computer and the devices. To enter data to the computer, the multiplexer continually scans the I/O devices and enters data from any which it finds transmitting, to the computer memory, in a manner which accommodates the various data rates and word formats of the devices, employing a direct memory access technique. The multiplexer includes one clock for each different I/O device data rate, the devices are scanned at a substantially higher rate than any of the clocks, and input data is assembled in an assigned memory location under control of a scan signal and a particular clock. The reverse process is employed to disassemble feed output information from the memory to a particular I/O device addressed under control of the computer accumulator.

INVENTOR
KENNETH E. BURKHALTER
BY Hauke, Krass, Gifford & Patalidis
ATTORNEYS

PATENTED NOV 23 1971 3,623,010

INVENTOR
KENNETH E. BURKHALTER

BY Hauke, Krass, Gifford & Patalidis
ATTORNEYS

LINE ADAPTER LOGIC

INVENTOR
KENNETH E. BURKHALTER
BY Hauke, Krass, Gifford & Patalidis
ATTORNEYS

CHAR / COUNT BUFFER LOGIC

INVENTOR
KENNETH E. BURKHALTER

BY Hauke, Krass, Gifford & Patalidis

ATTORNEYS

INPUT-OUTPUT MULTIPLEXER FOR GENERAL PURPOSE COMPUTER

BACKGROUND OF THE INVENTION

1. Field of the Invention

This invention relates to time-shared computers and more particularly to multiplexing interface devices for accommodating a plurality of input-output devices having various data rates and word formats to a computer.

2. Prior Art

In order to couple a number of digital data sources such as transducers, or input-output devices such as teletypes, magnetic tapes, cathode-ray terminals and the like, (hereinafter collectively referred to as I/O devices) with a single computer so that the computer may receive data from and service all of the devices on a time-shared basis, it is necessary to provide an interface unit which will accommodate the relatively low information transfer rates of the devices with the much higher data rate of the computer. Such interface units scan the devices at such high speeds and require such short times to transfer information to or from an I/O device that a large number of the devices may effectively communicate with the computer at their own data rates with no apparent delay so that the service, as viewed from device, appears as prompt as it would be if the computer were only servicing that single device.

In certain situations it is desirable that the computer be capable of operation with a variety of different forms of I/O devices which may be on the line simultaneously. These device types may each employ a different character format and operate at a different data rate. It is therefore desirable that the multiplexer unit be capable of accepting data in a wide variety of formats and rates and of providing such data to the computer in a uniform manner and conversely be capable of accepting output data from the computer in uniform manner and converting it into forms compatible with any one of the I/O devices. It is further desirable that the attachment of a new input-output device to the computer be simple in terms of the modifications which must be made to the system in order to adapt to the electrical characteristics of the new device.

SUMMARY OF THE PRESENT INVENTION

The present invention provides a time-shared multiplexer for a computer which is adaptable to connect the computer to input-output devices providing a wide variety of character formats and data rates in a manner that is very simple in terms of the modifications which must be made to the system to accommodate it to a new I/O device format and which makes very conservative use of computer time and memory space to accomplish an input or output transaction.

In a preferred embodiment of the present invention which will consequently be disclosed in detail, a multiplexer communicates with its associated computer at two levels. At one level the central processing unit of the computer connects to the multiplexer through an input-output but so that under program control the scanning operation may be started or stopped; the computer may determine which I/O device is being scanned at the instant or may advance the scan to any particular device; the information contained in a status register associated with each input-output device may be read into the computer; information destined for an input-output device may be transferred to that devices command register from the computer. All of these information transfers take place with the computer accumulator through an arithmetic unit and are performed under control of the computer program.

The second level of communication between the computer and serial I/O devices, i.e. line adapters, is directly with the computer memory through a time-shared buffer register. Each of the I/O devices is assigned two character assembly/disassembly control locations in the memory, one for input and the other for output. Each word location is adapted to store one I/O device character. Characters transmitted to an I/O device are first loaded directly into the first of that device's memory locations and a character received by the I/O device is assembled into the other of its memory locations. Transfers from the devices to the computer memory are done on a direct memory access basis and are initiated by a condition of the I/O device's status register rather than by a programmed instruction. Similarly, when information from the computer is to be transferred to an I/O device, the central processing unit modifies the condition of that device's status register and the transfer is made on a direct memory access basis under control of that register. The device may then transfer information with memory whenever it is ready and does not have to wait for the program to issue an instruction. The operating program in the computer proceeds to a memory interlaced basis with these transfers.

Each of the I/O devices is connected to the multiplexer through a bus connecting to a psuedoregister which connects to and contains the status of all the connections to the device. The registers each contain two sections, one for commands into the device and the other for status art of the device. The multiplexer includes a scanner which connects to these sequentially at a high rate. The scan sequence may be interrupted by the central processer unit for any of the interrogations or information transfers set forth above, and by the scan control itself when it connects to a register to or from which information is to be immediately transferred and a conditioning clock signal is also present.

The multiplexer contains a number of clocks equal to the number of different data rates the I/O devices which may be used with the system provide. If only two different types of I/O devices are to be employed, each employing a different data rate, two clocks would be provided. Each clock provides output pulses at a rate equal to five times the bit rate of its associated class of I/O device. These clock rates are only a small fraction of the much higher scanning rate. Accordingly, a device requiring service may be scanned a number of times before scanning will coincide with the occurrence of a conditioning clock pulse. Information stored in the line adapter register associated with a particular unit will determine which clock services that unit.

When the scan and the correct clock coincide for a unit requiring bit service the scan is stopped at the address of the interrupting device and the computer is placed in the data break mode. Than an addition is made into the high order three bits of the 12 bit word in the memory associated with the particular I/O device and the operation (transmit or receive). The scan then resumes and this process continues until the computer finds that a count of two is contained in the three bit section as a result of an addition made during the previous clock pulse. At that point one data bit is transferred either from the assigned core section to the device if the device is in the transmit mode, or from the device to the core section if the device is receiving. This process continues until all the bits of the character have been transferred. Since different types of I/O devices will have different number of bits in their characters marker bits introduced to appropriate stages of the memory section will signal the end of a transmission or reception.

Certain types of I/O devices will have character formats with numbers of bits which exceed the capacity of the assigned memory section, but circuitry is provided for accommodating these devices as long as the number of information bits does not exceed the storage capacity. Various loading techniques are employed to strip the character of its stop and start bits during transmission from an I/O device and to add the necessary stop and start bits during transmission to the device.

The following detailed description of the preferred embodiment briefly described above will make apparent other objects, advantages and applications of the present invention. The description makes reference to the accompanying drawings in which.

DESCRIPTION OF THE PREFERRED EMBODIMENT

While the present invention is adaptable for use in any situation wherein a plurality of data sources or data sinks or combination sources and sinks are to be coupled to a central processing unit on a time-shared basis, the invention was conceived and refined in connection with a text editing system employing a program controlled general purpose computer and a plurality of electric typewriters or teletype units, and the preferred embodiment of the invention constitutes that system. The preferred embodiment employs a PDP-8/L general purpose computer to perform the various storage and editing operations but it should be recognized that any suitable programmed general purpose computer, or hard-wired special purpose computer could be used in connection with the invention. The PDP-8 series are small scale, low-cost computers widely employed in control systems at the date of this application and larger numbers of this series of computers have been manufactured than any other general purpose computer so there is a wide degree of familiarity with this unit, among those skilled in the art. The following description accordingly will not describe the details of this computer and more complete details may be found in the PDP-8/L Users Handbook, copyright 1968 by Digital Equipment Corporation, Maynard, Massachusetts.

Figure 1:
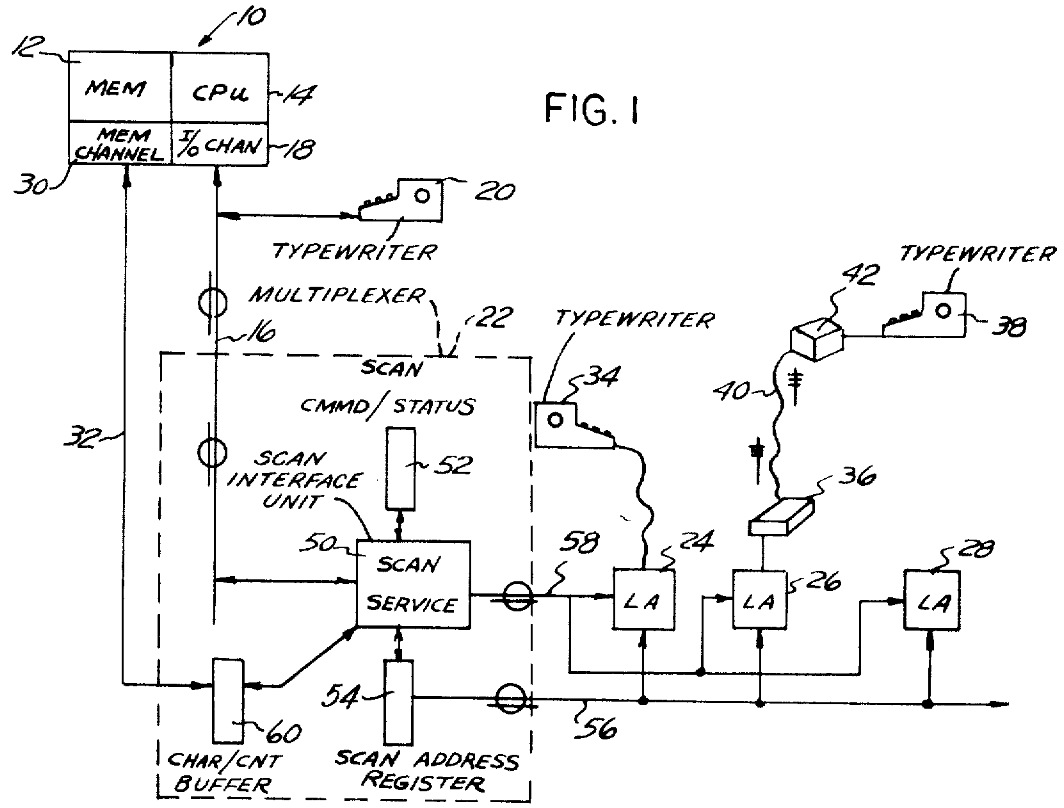
FIG. 1 is a schematic diagram of a multiplexing system for a general computer, with the major subsystems illustrated in block form.

In FIG. 1, a block diagram illustrating the broad organization of the system, the computer is generally indicated by the numeral 10. It includes a storage section 12 which in the PDP-8/L takes the form of random access magnetic core memory. The memory cycle requires 1.6 microseconds.

A central processing unit 14 includes an accumulator and an arithmetic unit and acts, under control of instructions stored in the memory, to perform various operations on information received from the memory and from input-output devices. These devices connect to the central processor through an I/O bus 16 containing all of the lines with which the computer communicates with input-output devices. This bus connects to the central processing unit through an I/O channel 18 in the computer. Any I/O device to be connected to the system connects with all the wires which form the bus 16. An electrically actuated typewriter 20 is schematically illustrated as connected to the bus 16.

The I/O bus 16 also makes connection with a multiplexer unit 22. The multiplexer in turn connects to a plurality of line adapters, three of which, 24, 26 and 28 are schematically illustrated in FIG. 1. The multiplexer functions to connect the input-output devices associated with the line adapters to the computer 10 on a time-sharing basis. The number of line adapters which may be connected to the computer through the multiplexer is a function of the rate of operation of the computer and the logical limitations of the multiplexer, and in the case of the preferred embodiment up to 32 units may be coupled to the multiplexer.

In addition to its connection to the computer input-output channel and central processing unit, through the I/O bus 16, the multiplexer 22 has direct access to the core memory 12 of the computer through a memory channel 30, which forms part of the computer and includes appropriate buffer registers. This connection is made through a line 32. Line 32 physically forms part of the I/O bus 16 but is shown separate therefrom to clarify the communicating relationships between the parts of the system.

A variety of different forms of input devices, output devices or input-output devices may be coupled to the line adapters. By way of example an electrically actuated typewriter 34 is illustrated as being connected to the line adapter 24. The line adapter 26 is illustrated as being connected to a modem 36 which communicates with a teletype unit 38 through a telephone switching system, schematically illustrated at 40, and a second modem 42 at the far end. The modems 36 and 42 translate the signals provided by the teletype unit 38 and the line adapter 36 into a suitable form for transmission over the phone line 40 and reconvert received signals into a form suitable for communication to their associated devices. By way of example the modems 32 and 46 may constitute Bell Telephone System Data Phones.

The line adapter 28 is illustrated as being unconnected to any I/O device. It might be coupled to a magnetic tape unit, a cathode-ray display terminal or the like.

The multiplexer 22 is schematically illustrated as including a scan interface unit 50 which makes the immediate connection with the I/O bus 16. The interface unit 50 contains the controlling logic of the multiplexer. It makes connection to a four bit scan command/status register 52 and a six bit scan address register 54. The scan address register makes connection with each of the line adapters via bus 56, while the scan interface unit makes connection with each of the line adapters by a bus 58.

The scan interface 50 transfers information with the computer memory 12 by a character/count buffer 60 which is connected to the line 32.

The operation of the system will be arbitrarily divided into two segments for purposes of description. In what will be termed the "program controlled mode" the status of the system will be communicated to the central processing unit 14 and the central processing unit may modify the condition of the system. In this mode the central processing unit may determine whether the scanner is running or stopped and may start the scan if it is stopped and vice versa. While the scanner is stopped the CPU may also determine which particular line adapter is being scanned by the scan address register 54 and may modify the contents of that register so as to address a different line adapter. The central processor may also determine the status of any of the registers contained within the line adapters and may modify their status as, for example, to indicate that information to be transmitted by a line adapter's associated input-output device is contained within the memory 12.

The second mode of operation of the system will be termed "automatic" and involves its normal operation wherein the line adapters are successively sampled by the scan unit to determine if they require service and the scanning is interrupted if a service request is detected to provide for the exchange of information between the input-output device associated with that line adapter and the computer memory.

Figure 2:
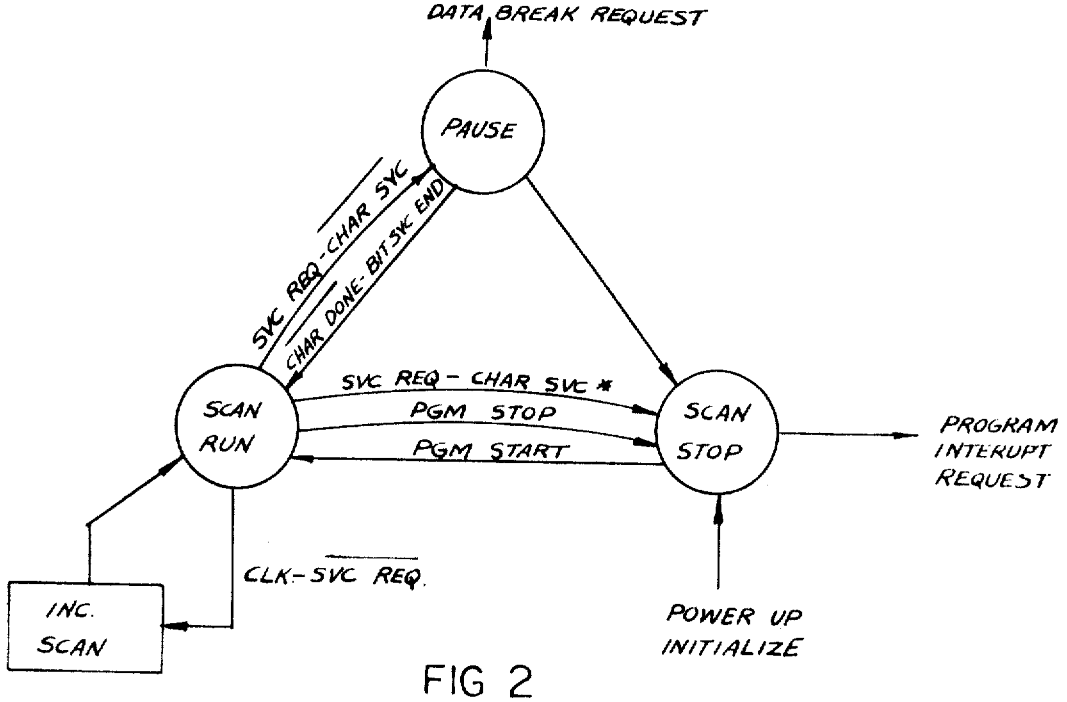
FIG. 2 is a state transition diagram for the multiplexer.

The automatic operation cycle is best understood in connection with the state transition diagram of FIG. 2. That diagram illustrates the three basic states of the multiplexer in circles as "scan stop"; "scan run"; and "pause". When the power is initially turned on the scanner is stopped. That is, the identification of a particular line adapter is contained in the scan address register 54 and that register is not being regularly incremented. Assuming that there is no service request from the line adapter then being addressed, the scanner may be shifted into the run mode under control of the central processing unit program. In the run mode the scan address register is incremented at regular intervals to address successive line adapters. This scanning continues until a line adapter is addressed which requires service. The presence of information to be transferred to or from the associated input-output device is not a sufficient condition for a service request to be initiated but other factors must be present as will be subsequently discussed. When a line adapter requiring service is addressed a transition is made to the pause state. If the line adapter requires bit service, (a single information bit is to be transferred to or from its input-output device) the multiplexer requests a data break from the computer while in the pause state. When that bit service request has been completed but a total character has not been completed the transition is made to the scan run state where the incrementing of the scan address register is renewed.

If a complete character has been received or transmitted at the completion of a bit service data break transition is made to the scan stop state rather than to the scan run state. In the pause state a program interrupt signal is generated to effectively provide information to the central processing unit about the completion of the operation so that the computer may modify its programmed sequence appropriately. Following the completion of the appropriate programmed service routines a program start signal is provided to the multiplexer by the computer to cause a transition to the scan run state.

Other important transitions which may be achieved under programmed control are that from scan run to scan stop in response to a character request from the central processing unit and a transition from scan run to scan stop in response to a central processing unit instruction.

AUTOMATIC MODE LOGIC

In the following description the logical elements are illustrated schematically and are preferably implemented in the preferred embodiment of the invention by integrated circuit modules. Certain of the conditioning inputs which are not useful in connection with an illustration of the principle and arrangement of the invention have been omitted. In the practice of the invention these can readily be supplied by a technician skilled in the art.

The description of the automatic mode logic also omits certain elements of the multiplexer which will be described in connection with a subsequent description of the program controlled mode.

Figure 3:
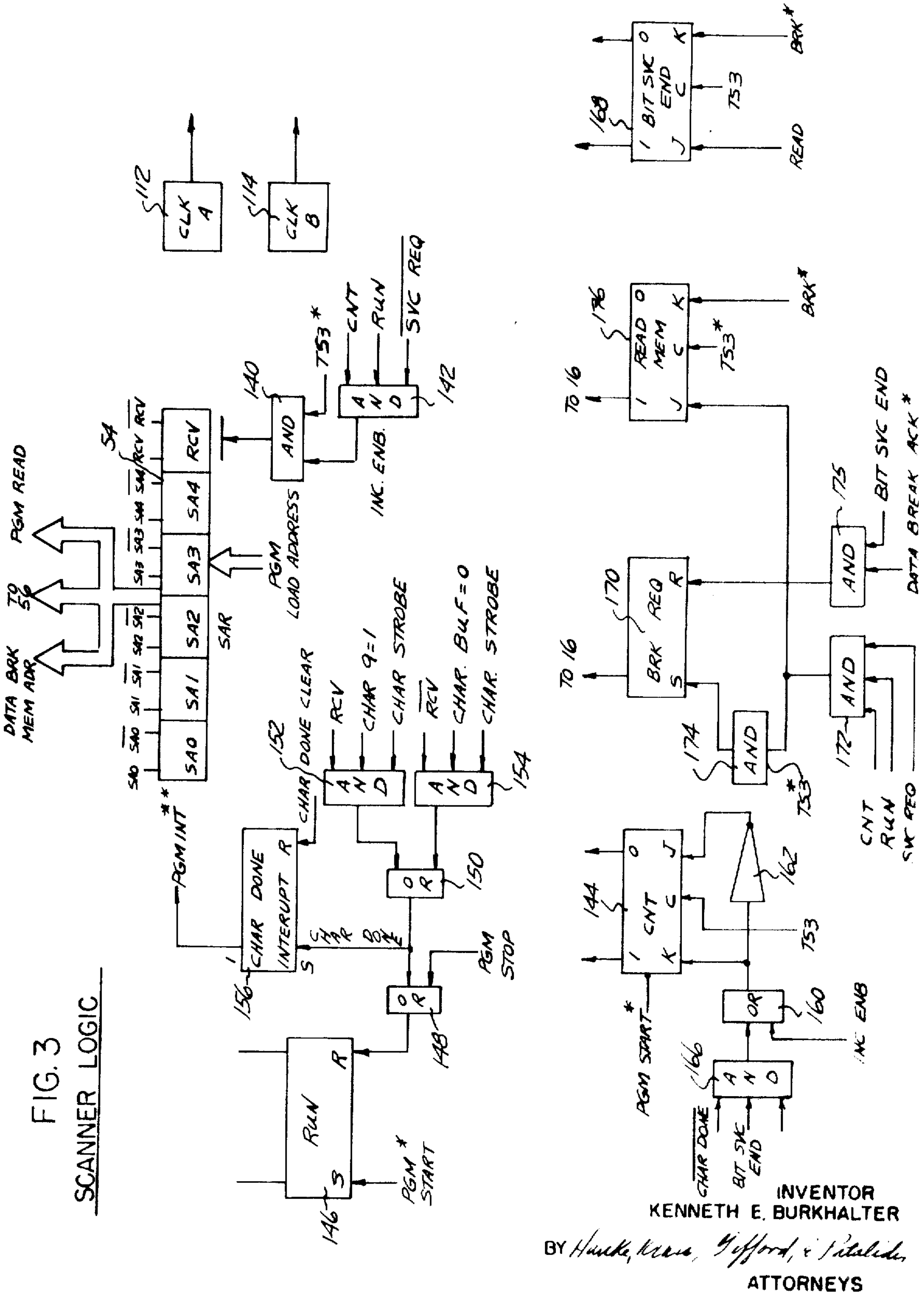
FIG. 3 is a block diagram of the logic employed in the scanner.

The scan address register 54 consists of a six bit ripple counter with high and low outputs provided from each of the stages. The stages of the scan address register 54 are termed, reading from the most significant position, shown on the left in FIG. 3 to the least significant position, SAO–SA4 and RCV. The RCV stage is the least significant position in the counter and the counter is incremented by adding 1's into this stage in a manner which will be subsequently described. The contents of the register may also be modified in a parallel fashion under program control as indicated by the arrow 100 and the contents may be read out in parallel fashion under program control as indicated by the arrow 102 or during a data break as indicated by the arrow 104.

Both the high and low outputs of each stage of the register are provided to each of the line adapters via bus 56 shown in FIG. 1. The RCV stage determines whether the scan address register is signalling a line adapter to determine if it contains a receive service request or a transmit service request. The other five stages of the scan address register may assume 32 different states so that 32 different full duplex input-output devices may be serviced with the scan address register.

Figure 4:
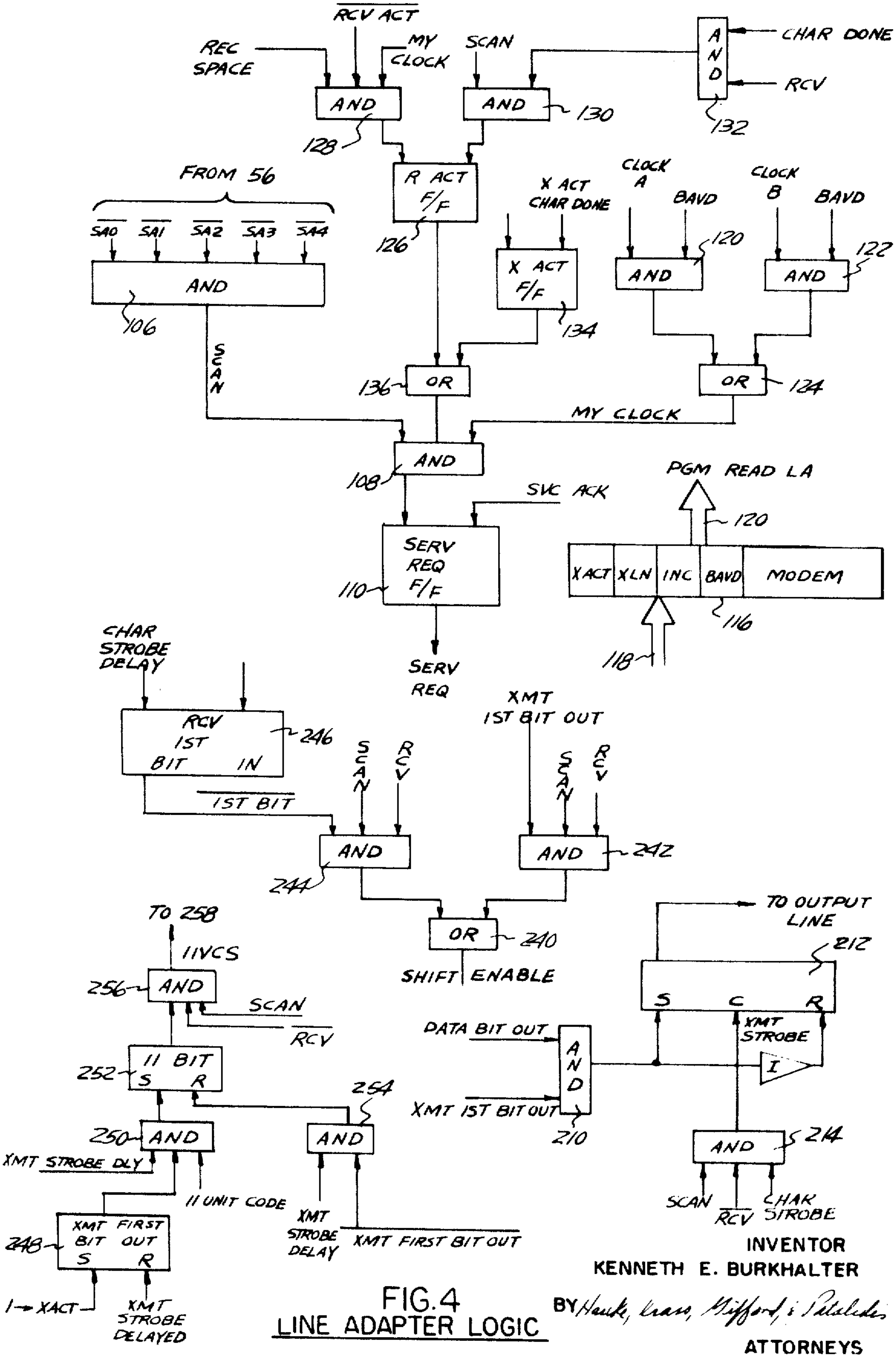
FIG. 4 is a block diagram of the line adapter logic.

Transferring our attention to FIG. 4, a typical line adapter logic is illustrated. All of the outputs from the bus 56 are connected to each line adapter and from these a particular choice of the outputs from the five most significant stages are employed to condition gate 106. The five inputs chosen are arbitrarily illustrated as $\overline{SAO}$, $\overline{SAI}$, SAZ, SA3, and $\overline{SA4}$. When the five most significant stages of scan address register 54 are in these particular states an input will be emitted from the AND-gate 106 to activate the other logic circuitry of that line adapter only. The output from the AND-gate 106 is denoted as SCAN and will be identified in that manner as inputs to other logical elements.

The SCAN output is provided to an AND-gate 108 which is operative to set a service request flip-flop (SERV REQ F/F) 110 when the other two inputs to the AND gate 108 are conditioned. When the service request flip-flop 110 is in a set state it indicates to the scan interface 50 that bit service is required by the unit and the transition is made from the scan state, to the pause state.

One of the other conditioning inputs to the AND-gate 108 is termed MY CLOCK and indicates that a pulse output is being provided from one of two crystal controlled clocks 112 and 114 contained within the scanner logic and respectively termed CLK A and CLK B. The outputs from the two clocks 112 and 114 are provided to all of the line adapters by the bus 58.

By virtue of the provision of the outputs of the two clocks 112 and 114 to all of the line adapters, each of the line adapters of the system is capable of handling I/O devices having two different data rates. The system can be modified to connect with additional devices having other data rates by the provision of suitable additional clocks in the scan interface. The clocks are chosen to have frequencies equal to five times the data rates of the devices which they are associated. The reason for this particular frequency choice will be subsequently described.

The line adapter logic of FIG. 4 selects its particular clock from the bus 58 under control of a flip-flop termed BAUD contained within a line adapter status register 160. The register 160 is illustrated as a five stage register and will be described in greater detail subsequently. The contents of the register may be modified by the program as signified by the arrow 118 and the contents of the register may be read to the central processing unit as indicated by the arrow 120.

The state of the BAUD stage in line adapter register 116 conditions an AND-gate 120 which has as its other conditioning input the CLK A signal from bus 58 while an AND-gate 122 is conditioned by the signal BAUD and CLK B. The outputs of the AND gates 120 and 122 are summed by an OR-gate 124 to provide a second conditioning input to the AND-gate 108 which is termed MY CLOCK. The third conditioning input to the AND-gate 108 indicates whether the associated I/O device is receiving, (that is, the keyboard is being utilized, or signals are being received from a remote keyboard via a modem,) or transmitting (there is information contained in the computer memory which is to be transmitted through the I/O device). The receiving condition is indicated by a flip-flop 126, termed R ACT, being in its set state. It is set by the output of an AND-gate 128 when a space is actually being received from the associated I/O device and a MY CLOCK output is provided by the OR gate 124 and the flip-flop 126 was not previously set. The R ACT flip-flop 126 is reset by an AND-gate 130 which is in turn conditioned by SCAN, and the output of an AND-gate 132 which has the RCV input from the least significant stage of the SCAN address register 54 as one input and character done signal (CHAR DONE) from the scanner logic as its other input. Thus the R ACT flip-flop is set when the input-output device is receiving information and the associated CLOCK 112 or 114 is emitting a pulse and is reset after a complete character has been received and the other appropriate inputs are present.

A transmit active flip-flop 134 is set when an X ACT signal is present in the line adapter register 116. This signal is loaded into the line adapter register in the program load mode when information to be transmitted via the input-output device is present in the computer memory. The flip-flop 134 is reset upon receipt of the CHAR DONE signal. An OR-gate 136 sums the outputs of the R ACT flip-flop 126 and the X ACT flip-flop 134 to provide the third conditioning input to the AND gate 108.

By this arrangement the service request flip-flop 110 is set at such time as the particular line adapter with which it is associated is being addressed by the SCAN address register, the particular CLOCK 112 or 114 with which the line adapter is associated is high, and there is information to be transferred to or received from the associated input-output device. The service request flip-flop 110 is reset by a service acknowledge (SVC ACK) signal from the scanner interface logic bus 58.

Returning now to the scanner logic the scan address register 54 is incremented by pulses provided to the least significant stage by an AND-gate 140. One of the conditioning inputs of the ANDtgate 140 is a timing signal TS3*. This signal is generated by the computer central processing unit at a particular time in each memory cycle. It is provided to the multiplexer by bus 16. All of the conditioning inputs that are received from the computer will be identified by a single asterisk.

The AND-gate 140 is also conditioned by the output of an AND-gate 142 which is in turn conditioned by the absence of a service request from any of the line adapters ($\overline{\text{SVC REQ}}$) and conditioning inputs from the set sides of a count (CNT) flip-flop 144 and a RUN flip-flop 146. Thus the scan address register 54 is incremented once in each computer cycle as long as no service request is encountered and the count and run flip-flops are set.

The run flip-flop 146 is set by a program start signal (PGM START*). This signal is received from the bus 16 and causes the restart of the scan address register after completion of a character service operation by the computer. The run flip-flop is reset by the output of an OR-gate 148 which sums a PROGRAM STOP* input from the computer and the output of an OR-gate 150. The OR-gate 150 sums the output of a pair of AND-gates 152 and 154 which respectively indicate that a complete word has been received from an input-output device being serviced and stored in its appropriate memory location or that a complete word has been transmitted out by an I/O device and the memory location in which it was previously stored is now ready for entry of another word to be transmitted. Either of these conditions are intended to cause a transition of the multiplexer system from its scan run mode to the pause mode.

The inputs to the AND-gate 152 are RCV from the least significant stage of the scan address register 54 and a pair of inputs associated with the character/count buffer 60. One is CHAR 9=1 which means that all the bits in a character will have been received and fully loaded into the character/count buffer upon the occurrence of CHAR STROBE, the other input, which transfers the received bit to the character/count buffer.

The inputs of the AND-gate 154 are $\overline{\text{RCV}}$, indicated that the transmit section of a particular line adapter is being addressed by the scan address register, CHAR BUF indicating that zeros are in the first eight stages of the character buffer register and effectively all of the information contained therein has been transmitted to the input-output device and CHAR STROBE, again indicating that the last bit is being transferred. Thus, the run flip-flop 146 is reset at the termination of the transfer of a character between the I/O device and the computer memory in either direction, terminating the incrementing of the scan address register and effectively shifting the state of the system from scan run to scan stop.

The output of the OR-gate 150 is also employed to set a flip-flop 156 termed CHAR DONE INTERRUPT. The setting of this flip-flop generates the programmed interrupt signal (PGM INT**). All of the signals which are supplied to the computer by the multiplexer unit are designated by this double asterisk. The generation of the program interrupt signal switches the system from scan stop to pause. At the completion of the central processing unit's program routine which is initiated when the program interrupt signal is provided, the computer provides the multiplexer with a CHAR DONE signal (CLEAR*) which resets the flip-flop 156. If certain other conditions are existent the CHAR DONE CLEAR signal also resets the flip-flop 146 to reset.

The CNT flip-flop 144 is a J–K type which is conditioned by the timing signal TS3 as well as an output from an OR-gate 160. The output of the OR-gate 160 goes directly to the K input while the J input is conditioned by the output of an inverter 162 which receives the output of the OR-gate 160. The OR-gate sums the increment enable output of the AND-gate 142 and the output of an AND-gate 166 which has CHAR DONE (the inverse of the output of the OR-gate 150) as one input and the output bit service (BT SVC) flip-flop 168 as its other input. The flip-flop 144 also has another input which allows it to be set by PGM START*.

As has been noted when the CNT and RUN flip-flop 144 and 146 are both high and there is no service request the scan address register is incremented at time state 3. When the count and run flip-flops are both set and there is a service request a break request (BRK REQ) flip-flop 170 is set at time state 3 through a pair of AND-gates 172 and 174. The output of the AND-gate 172 is also provided to the J input of a JK read memory (READ MEM) flip-flop 176 and at time state 3 that flip-flop is set.

The flip-flop 170 is reset by a signal from an AND-gate 175 conditioned by the DATA BRK ACK signal from the computer and the set condition of the flip-flop 168.

The output of the break request flip-flop 170 signals the computer requesting a data break via bus 16. The set output of the read memory flip-flop 176 is also provided to the computer via the bus 16 and indicates that the service requested is the first state of a two state data break wherein data is first read from the core position, the address of which is indicated by the scan address register, and provided to the character/count buffer 60. At the end of this first data break memory cycle a signal from the computer designated BUF BRK will reset flip-flop 176 at time state 3. At the same time the set output of the flip-flop 176 will have set the BIT SVC and flip-flop 168 indicating to the computer that it is the last half of the two cycle memory break. The flip-flop 168 is reset by the next BUF BRK signal from the computer.

BIT SERVICE

When the central processing unit 14 grants a break request in response to a set condition of the flip-flop 16 the contents of the particular word location in the core memory associated with the section of the line adapter then being addressed by the scan address register 54 are transferred to the character/count buffer 60. The scan address represents one portion of the address associated with a particular memory word and the page location is permanently retained within the computer.

Figure 5:
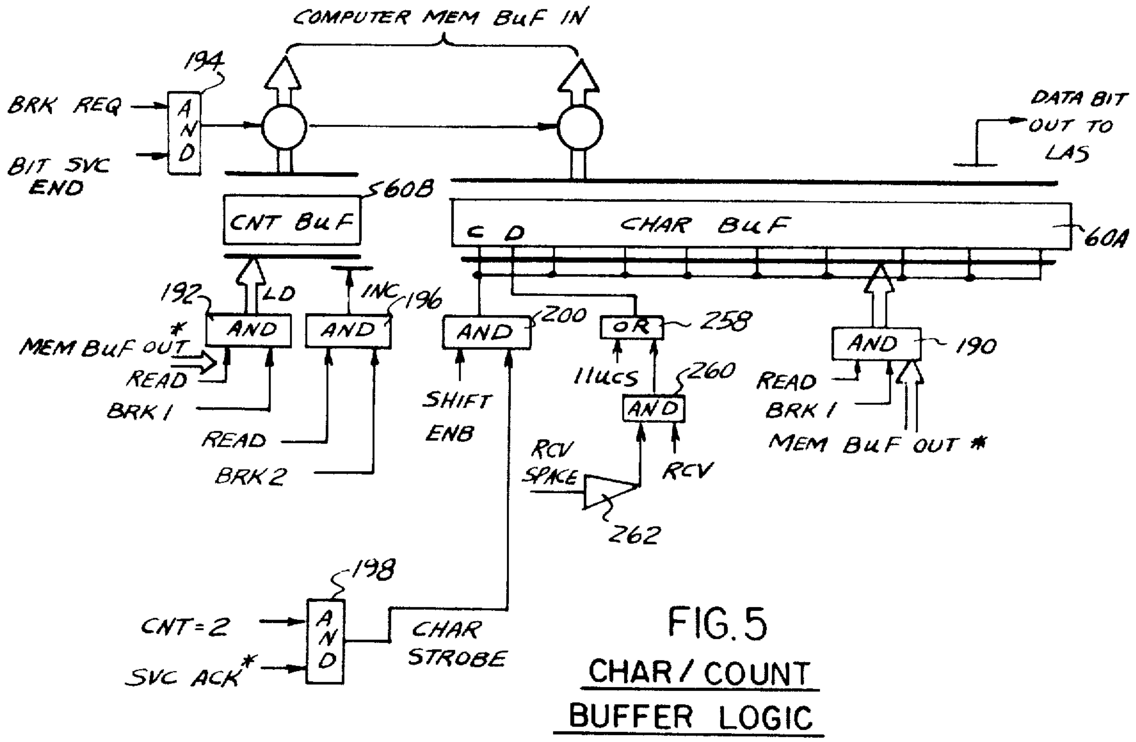
FIG. 5 is a block diagram of the character/count buffer logic.

The character/count buffer 60 as illustrated in FIG. 5 as being composed of two sections, 60A and 60B. The character buffer section 60A stores nine of the bits of the computer word and the count buffer 60B stores three bits. An AND-gate 190 which is conditioned by the set condition of the read memory flip-flop 170 and a BRK 1 signal provided by the computer provides the contents of the memory buffer to the character buffer in parallel fashion. Similarly an AND-gate 192 loads the contents of the three least significant stages of the memory buffer into the count buffer 60B upon the occurrence of the same conditions. At the end of a bit service cycle the contents of the character buffer 60A and the count buffer 60B are reloaded into the computer memory buffer register under control of a gate 194 which is conditioned by the set states of BRK REQ flip-flop 170 and BIT SVC END flip-flop 168.

The count buffer 60B is essentially employed to determine the middle of a character being received or transmitted. As has been noted, the clocks 112 and 114 have pulse rates equal to five times that of their associated line adapters. Thus, if a count of clock pulses is started at the beginning of receipt of pulse from an I/O device, or when a pulse is to be transmitted to an I/O device, the center of the pulse will appear in approximate synchronism with the third clock pulse counted. The scanning rate of the multiplexer is very high relative to the rates of the clocks 112 and 114 so that the scan reaches each line adapter during the period of a given clock pulse. Accordingly, the third time a line adapter containing a service request is scanned, and a clock signal is present, the center period of a pulse to be transmitted or received will be occurring.

In order to perform this count an AND-gate 196 provides a count which increments the count buffer 62B upon receipt of a timing pulse from the computer BRK 2 and a signal representative of the set conditions of the REA flip-flop 176.

The count in the buffer 60B is checked by an AND-gate 198 which receives an input only when the count in the buffer is equal to two (the third time bit service is granted to a line adapter in response to a service request). The AND-gate 198 is also conditioned by a SVC ACK* output from the computer and provides an output which is termed CHAR STROBE. This output is provided to an AND-gate 200 which has a SHIFT ENB line as its other conditioning input. The AND-gate 200 conditions the least significant flip-flop of the character buffer register section 60A to increment the register. This causes a data bit output to the line adapters from the most significant stage of the register section 60A.

As may be seen in FIG. 4 a data bit out from the most significant stage of the character buffer 60A conditions one input of an AND-gate 210 which has a signal $\overline{\text{XMT FIRST BIT OUT}}$ as its other input. The development of this second signal will be described subsequently but it indicates that the line adapter is in the transmit mode and this is not the first bit being transmitted. The AND-gate 210 sets a flip-flop 212 when a conditioning pulse from an AND-gate 214 is present at the flip-flops clock input. The AND-gate 214 is conditioned by SCAN, RCV and CHAR STROBE from AND-gate 198. The set output of the flip-flop 212 generates a signal which is directed to the input-output device associated with that line adapter. The flip-flop 212 is reset by an inverter driven by AND-gate 210. Thus the line adapter which initiated the service request that led to bit service provides an output to its input-output device under the appropriate conditions. The output of the AND-gate 214 is termed XMT STROBE and is employed at other points in the circuitry.

When the contents of the memory buffer output are read into the character buffer via AND-gate 190 at the beginning of a bit service routine, precautions must be taken to accommodate the bit service process to the length of the character signal utilized by the particular I/O device being serviced. The character buffer 68 contains nine stages. During the receiving mode the computer initially prepares the buffer for use by inserting a 1 in that stage of the core memory location assigned to a particular I/O device which is removed from the rightmost stage by the number of information bits in the I/O device character. If an I/O device character was six information bits a 1 will be inserted in the sixth stage to the left in the work location by the computer. In preparation for a transmitting routine a 1 is inserted by the computer in the N plus 1 stage to the left, that is, for a six bit character a 1 is inserted in the seventh stage to the left.

The computer does this under program control, having information stored which relates to the character length of each of the input-output devices. When an input-output device is changed suitable information must be provided to the computer to change the manner in which it prepares the associated core storage location.

These marker bits which are inserted by the computer in the core, control the actuation of flip-flop 156 which indicates that a character is done. During the receive mode the AND-gate 152 provides an output when character nine the most significant stage of the register or the right-hand stage) equals 1. This means that the marker bit has progressed from its initially loaded location through the register to the right and the appropriate number of bits have been received. During the transmit mode AND-gate 154 emits a pulse when all stages in the character buffer are zero. This means that the character buffer has been shifted enough times to emit the marker pulse which then acts as a stop bit in a transmitted word.

The shift enable signal to AND-gate gate 200, which shifts the contents of the character buffer register 60A, is provided by an OR-gate 240 illustrated in FIG. 4. The OR-gate has inputs from an AND-gate 242 which provides an appropriate shift signal during the transmit mode and an AND-gate 244 which provides an appropriate shift signal during the receive mode.

The AND-gate 242 is conditioned by $\overline{\text{RCV}}$, SCAN and $\overline{\text{XMT FIRST BIT OUT}}$. Thus a shift enable signal is provided during the transmit mode each time scan occurs and the first output bit has already been provided.

The AND-gate 244 emits a pulse when conditioned by the inputs RCV, SCAN and RCV FIRST BIT OUT. The RCV FIRST BIT OUT signal is provided by flip-flop 246 which is set by the output of AND-gate 128 indicating that a space is being received and MY CLOCK is present. The flip-flop 246 is reset by the delayed CHAR STROBE signal. Thus the flip-flop 246 becomes previous to the shifting of the character buffer register 68 for the first time during a receiving cycle and is reset for the balance of that cycle. By preventing a shift during the first receive cycle it effectively discards the first bit received which is simply a start bit for the character and does not contain any true character information. Since the start bit is discarded and only a single stage of the character buffer 68 is required for a marker bit, the system can receive characters contained up to eight information bits. As has been noted characters containing lesser number of information bits are accommodated by adjustment of the position of the marker bit by the computer in core storage.

The signal $\overline{\text{XMT FIRST BIT OUT}}$ is developed by a flip-flop 248 which is set when the X ACT stage of the line adapter register 116 is initially set by the computer. An appropriate differentiating network (not shown) may be used to derive this signal. It is reset by the next XMT STROBE signal, slightly delayed, so that it is only set during the first XMT STROBE time in a series of bit service cycles. Thus, the shift enable signal from the OR-gate 240 is present during all bit service cycles in a transmitting mode except the first. At the same time the AND-gate 210 associated with the flip-flop 212 does not provide an output signal. Since the output signals to the line are inverted (in the sense that the normal condition of the line is high and a 1 is signified by the line going low) this effectively adds a start bit to a message to be transmitted without the necessity of storing that start bit in either core storage or the character buffer.

The $\overline{\text{XMT FIRST BIT OUT}}$ flip-flop 248 also conditions an AND-gate 250 along with the XMT STROBE DLY signal and a 11-unit code signal from the line adapter register 116. The timing of the XMT STROBE DLY signal is such that the AND-gate 250 provides an output pulse when its other signals are present before the XMT STROBE DLY signal resets the flip-flop 248. The output of the AND-gate 250 sets flip-flop 252 which is termed 11-bit flip-flop. This flip-flop is reset by the output of an AND-gate 254 conditioned by the XMT STROBE DLY and $\overline{\text{XMT FIRST BIT OUT}}$. It is accordingly set at the end of the transmitter XMT STROBE cycle in which the flip-flop 248 is reset and remains set until the next XMT STROBE occurs.

The output of the 11-bit flip-flop 352 is provided to an AND-gate 256 which is also conditioned by the SCAN signal and $\overline{\text{RCV}}$. The output of the gate 256 is provided to an OR-gate 258 which adds a 1 into the initial stage of the character buffer register 60A.

The 11 UC stage of the line adapter register 116 is loaded with a 1 by the computer when the input-output device associated with the line adapter employs a code character containing one start bit, eight character bits and two stop bits, or a total of 11 bits. When this character code is received the eight signal characters are stored along with one marker bit. When this signal is to be transmitted the shift of the character buffer 60A is delayed during the first cycle as has been previously noted, to add a start bit to the transmitted message. The marker pulse acts as the first stop bit, and the addition of the 1 into the leftmost stage of the character buffer register 68 by the OR-gate 258 during the second cycle, under control of the flip-flops 252 and 248, adds a second marker pulse. In this manner an 11 unit containing eight information bits is stored and transmitted employing only a nine-stage register.

The OR-gate 258 also has input from an AND-gate 260 which is conditioned by the RCV signal and a signal from an inverter 262 which provides an output when a space is being received. By this method the received bits are successively loaded into the character buffer.

The system may also accommodate input-output devices having a full parallel character. When such a unit is interrogated by the scanner and has a parallel character being received an appropriate signal is provided to the computer and that character is loaded directly into the accumulator under program control, rather than going through the memory, so that they may be properly operated upon.

PROGRAM CONTROL MODE

Figure 6:
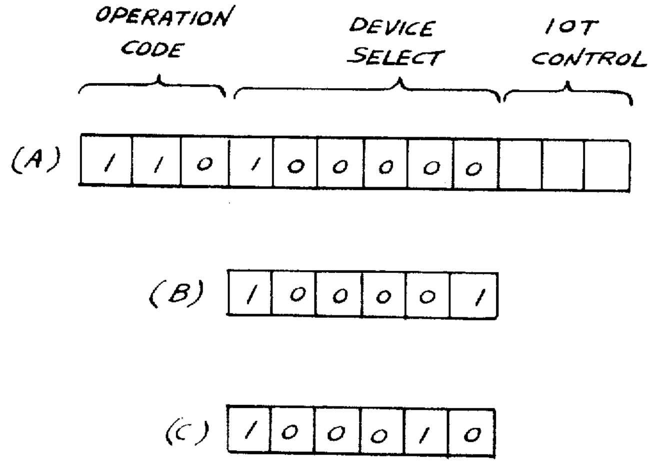
FIG. 6 illustrates the numerical form of instructions which allow the computer to communicate with the multiplexer.

The program control mode is quite straightforward and will not be discussed in any detail. This communication between the multiplexer and the central processing unit is controlled by the central processing unit employing word formats of the type illustrated in FIG. 6. The computer word contains 12 bits. When the first three bits contain an operation code of 110 the interaction of the CPU and multiplexer are called for. The next six bits of the computer word define whether communication is to be had with a line adapter (device select code 10000) the scanner 50 and 52 (100001) or the scan address register 54 (100010).

The last three bits of the word contain signals commanding particular IOT pulses. These pulses are emitted by the computer at sequential points in a memory cycle and can be used to provide control signals to the device that is selected with the balance of the word. Since three sequential pulses are provided and the absence of pulses at all of the three times is not a very meaningful condition, up to seven control operations can be called for. These include reading the unit, in which the contents of the unit are provided to the accumulator, loading the unit, inverting certain selected states of the unit, and first clearing the accumulator and then loading the contents of the unit into the accumulator. An appropriate series of these pulses may be used to transfer a fully parallel character directly into the accumulator.

Having thus described my invention, I claim:

1. A multiplexing system, comprising:

a programable computer including a central processing unit and a modifiable data storage memory separate from said central processing unit;

a plurality of data input-output devices operative to transmit and receive data in binary coded form as a series of characters, at least certain of said devices having character configurations and data transfer rates which differ from other of the devices;

and a multiplexer connected to the computer and to each of the input-output devices operative to control the flow of data between the computer and the input-output devices, said multiplexer including:

a scanner having a first mode of operation wherein it sequentially makes connection with each of the input-output devices at a first, relatively high rate in synchronism with the operation of the computer, and a second mode of operation wherein it maintains its connection with one of said input-output devices;

a plurality of clocks each having a different output rate which is a multiple of the data transfer rate of at least one of the input-output devices and is substantially lower than said first scanning rate; means associated with each input-output device operative to cause the scanner to switch from its first mode to its second mode upon the simultaneous occurrence of a pulse from the clock having the data rate which is a multiple of the data rate of that particular device, that particular device being connected to the scanner, and the occurrence of either data being transmitted by that input-output device or data loaded in the computer memory for transmission to that input-output device; and means for transferring data between the computer and a particular input-output device during at least certain of the times in which the scanner is in its second mode and the scanner is connected to that input-output device, said transferring means being connected to the scanner.

2. The multiplexer of claim 1 wherein the computer performs a sequence of operations under control of instructions stored in its memory and means are provided within the multiplexer to cause the multiplexer to interrupt said sequence while a transfer of data between the memory and the input-output devices is being accomplished, said interruptions occuring at such time as the scanner is switched from the first mode into its second mode.

3. The multiplexer of claim 1 wherein a register is associated with each input-output device and means are provided, within each register, operative upon the simultaneous occurrence of a scanner connection to a particular device, the occurrence of a pulse from the clock associated with such device and the existence of data to be transferred between such device and the memory, for modifying the contents of the register associated with such device, and wherein certain states of the register condition the transfer of data between the register and the memory so that such transfers only occur at selected occurrences of the simultaneous scanner connection, a pulse output from the associated clock, and the existence of data to be transferred.

4. The multiplexer of claim 1 wherein each input-output device has a data storage register associated therewith and all connections to such input-output device are made through such data storage register, and wherein said data storage register contains information which is a function of the data rate of the associated input-output device, said data being employed to identify the clock having a rate which is a multiple of the data rate of such input-output device.

5. The multiplexer of claim 4 wherein each data storage register includes a section containing information relating to the character format of its associated input-output device and the multiplexer includes means for modifying the data transfer between the computer memory and the input-output device based on the contents of such section.

6. The multiplexer of claim 1 wherein said modifiable data storage memory includes space for storing information received from each input-output device, space for storing information to be transferred to each input-output device, and space for data which is a function of the nature of the character format of each input-output device, and including means for transferring data between said memory sections and each input-output device in accordance with the contents of said memory which relates to the character format of the input-output device to or from which data is being transferred.

7. In a system including a programable computer having a memory storage section and a central processing unit which performs a sequence of operations under control of instructions stored in the memory, and a plurality of data input-output devices each having a data transfer rate substantially lower than the data acceptance and transmission rate of the computer, at least certain of the input-output devices having data rates and word formats which differ from those of other of the input-output devices, means for connecting all of the input-output devices to the computer so that it may service them on a time-shared basis, comprising:

a multiplexer device;

electrical connections between the multiplexer device and the computer memory, the computer central processing unit and each of the input-output devices;

a plurality of line adapter data registers each having a transmit section, a receive section, one being associated with each input-output device and being connected between that device and the multiplexer;

a scanner associated with the multiplexer operative to make sequential connection with each of the line adapter registers, and to make sequential connection with the receive and the transmit section within a line adapter register;

first logic means contained within the multiplexer operative under control of signals from the computer central processing unit to start the scanning process, second logic means contained within the multiplexer operative to stop the scanning process, third logic means contained within the multiplexer operative to determine the condition of the scanning process, fourth logic means contained within the multiplexer operative to modify the state of the scanning process, fifth logic means contained within the multiplexer operative to determine the condition of a line adapter register connected to the scanner and sixth logic means contained within the multiplexer operative to modify the condition of a line adapter register connected to the scanner;

a plurality of clocks contained within the multiplexer each being associated with a particular one of the line adapter units;

8. The system of claim 7 wherein each of the clocks has a regular pulse output rate equal to an odd integral multiple of the data rates of the input-output devices with which it is associated.

* * * * *

UNITED STATES PATENT OFFICE

CERTIFICATE OF CORRECTION

Patent No. 3,623,010 Dated November 23, 1971

Inventor(s) Kenneth E. Burkhalter

It is certified that error appears in the above-identified patent and that said Letters Patent are hereby corrected as shown below:

Column 1, line 58 delete "but" and insert --bus--. Column 7, line 2 after "AND" delete "t". Column 9, line 45 "work" should be --word--; line 59 after "nine" insert --(--; line 69 after "gate" delete "gate". Column 10, line 6 "RCV FIRST BIT OUT" should be --RCV FIRST BIT OUT--. Column 14, line 6 after "units;" insert --and means, connected to the computer, for interrupting the normal sequence of performence of instructions by the computer upon the simultaneous occurrence of the scanner being connected to a particular section of the line adapter register, the occurrence of a pulse from a clock associated with that line adapter register, and the presence of information in the line adapter register indicative of either the fact that the associated input-output device is transmitting data or that data to be provided to that associated input-output device is contained within the computer memory.--.

Signed and sealed this 23rd day of May 1972.

(SEAL)
Attest:

EDWARD M.FLETCHER, JR.
Attesting Officer

ROBERT GOTTSCHALK
Commissioner of Patents